United States Patent Office 3,239,570
Patented Mar. 8, 1966

3,239,570
HYDROFORMYLATION OF OLEFINS
Lynn H. Slaugh, Pleasant Hill, and Richard D. Mullineaux, Oakland, Calif., assignors to Shell Oil Company, New York, N.Y., a corporation of Delaware
No Drawing. Filed July 8, 1963, Ser. No. 293,247
13 Claims. (Cl. 260—632)

This application is a continuation-in-part of copending application, Serial No. 46,071, filed July 29, 1960, now abandoned.

This invention relates to the production of aldehydes and/or alcohols from olefinically unsaturated compounds. The invention relates more particularly to the production of aldehydes and/or alcohols by the addition of carbon monoxide and hydrogen to olefinic hydrocarbons in the presence of an improved catalyst.

Processes directed to the production of reaction mixtures comprising substantial amounts of aldehydes and at times lesser amounts of alcohols by the reaction of olefinic compounds with carbon monoxide and hydrogen at elevated temperatures and pressures in the presence of certain catalysts are well known in the art. The aldehydes and alcohols produced generally correspond to the compounds obtained by the addition of a carbonyl or carbinol group to an olefinically unsaturated carbon atom in the starting material with simultaneous saturation of the olefin bond. Isomerizaiton of the olefin bond may take place to varying degrees under certain conditions with the consequent variation in the products obtained. These processes known in the industry and referred to herein as hydroformylation, involve reactions which may be shown in the general case by the following equation:

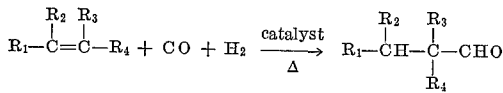

and/or

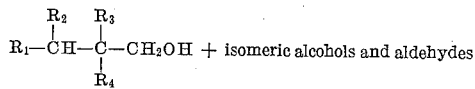

$+$ isomeric alcohols and aldehydes

In the above equation, each R represents an organic radical, for example hydrocarbyl, or a suitable atom such as hydrogen or a halogen. The above reaction is similarly applied to an olefinic linkage in a cycloaliphatic ring.

In the past, dicobalt octacarbonyl as such or in several different forms generally has been used as the catalyst for the hydroformylation of olefins. This catalyst, which can be prepared from many forms of cobalt, usually decomposes rapidly unless high pressures (1000–4500 p.s.i.g.) of carbon monoxide are maintained. Correspondingly high pressures of hydrogen are also necessary. A most serious disadvantage of prior hydroformylation processes, however, has been the necessity of proceeding in two steps when alcohols are the desired product. Thus in processes disclosed heretofore, it is generally necessary first to react the olefin to be hydroformylated with carbon monoxide and hydrogen to form the corresponding aldehyde. It is then necessary to carry out a second reaction with hydrogen to reduce the aldehyde to the alcohol in a separate operation. A different catalyst for the hydrogenation is usually needed for this second step since the hydroformylation catalysts heretofore employed are not sufficiently effective for this purpose. This results in the need for relatively expensive high-pressure equipment and for a large amount of such equipment to handle the two steps.

A further disadvantage inherent in processes directed to hydroformylation disclosed heretofore is a relative inability to direct the reactions involved to the production of predominantly terminal alcohols when the olefin contains more than two carbon atoms, particularly when the charge to the process comprises primarily internal olefins.

It is therefore an object of the present invention to provide an improved hydroformylation process enabling the more efficient production of aldehydes and/or alcohols by the catalytic reaction of olefinic compounds with carbon monoxide and hydrogen.

Another object of the present invention is the provision of an improved hydroformylation process enabling the more efficient production of aldehydes and/or alcohols by reaction of olefinic compounds with carbon monoxide and hydrogen in the presence of an improved hydroformylation catalyst.

Still another object of the present invention is the provision of an improved hydroformylation process enabling the more efficient single stage production of alcohols by the reaction of olefinic hydrocarbons with carbon monoxide and hydrogen in the presence of an improved catalyst enabling the use of substantially lower pressures than generally possible heretofore.

Still another object of the present invention is the provision of an improved process enabling the more efficient, direct single stage hydroformylation of internal olefins to reaction products predominating in terminal alcohols. Other objects and advantages of the present invention will become apparent from the following detailed description thereof.

In accordance with the present invention, olefinic compounds are converted to saturated aldehydes and/or alcohols having one more carbon atom than the olefinic compounds by reacting the olefinic compounds in liquid phase, with carbon monoxide and hydrogen, at a temperature of from about 100° to about 250° C., preferably from about 100° to about 175° C., in the presence of a catalyst comprising a metal from Group VIIB or Group VIII of the Periodic Table of the Elements excluding iron, nickel, and palladium, in complex combination with carbon monoxide and an arsenic-containing ligand consisting essentially of a teritary organo arsenic compound in which the arsenic is trivalent (referred to herein as arsines).

The suitable metals of Group VIIB and Group VIII employed as the metal component in the complex catalysts employed in the process of the present invention consist of manganese, cobalt, ruthenium, rhodium, rhenium, osmium, iridium, and platinum. The complex catalysts containing these metals as essential components are not necessarily equivalent in their effectiveness in catalyzing the hydroformylation reaction under all conditions. Preferred are the defined complex catalysts wherein the metal component is a Group VIIIA metal or a Group VIIIB metal having an atomic number of at least 27. The Group VIIIA metals are iron, ruthenium and osmium; the Group VIIIB metals are cobalt, rhodium, and iridium. Iron is excluded from the essential catalyst components, being unsuited for the purpose of the invention. The specific complex preferably employed may vary within the scope of the invention in accordance with the specific olefinic compound being hydroformylated and the specific conditions employed. Outstanding in their ability to catalyze efficiently, the hydroformylation reaction are the catalysts of the present invention comprising a metal of Group VIIIB, particularly cobalt or rhodium, in complex combination with carbon monoxide and an arsenic compound.

For the purpose of simplicity, the following detailed description of the invention will stress the use of the preferred cobalt-containing complexes as the catalysts. It is to be understood, however, that such illustrative use of the cobalt-containing catalysts is not intended to limit the scope of the invention thereto and that any of the suitable Group VIIB and Group VIII metal-containing complexes defined herein are comprised within the scope of the invention.

In their active form, the suitable complex catalysts will contain the Group VIIB or Group VIII component in a reduced valence state. As used throughout this specification and claims, the term "complex" means a coordination compound formed by the union of one or more electronically rich molecules or atoms capable of independent existence with one or more electronically poor molecules or atoms, each of which is also capable of independent existence.

In the suitable ligands containing trivalent arsenic comprised in the complex catalyst employed in the process of the invention, the arsenic atom has one available or unshared pair of electrons. Any essentially organic derivative of trivalent arsenic with the foregoing electronic configuration is a suitable ligand for the complex catalysts of the present invention. It will operate as a ligand in forming the desired complexes used as catalysts in the present process.

Organic radicals of any size and composition may be bonded to the arsenic atom. Contemplated within the scope of this invention, therefore, are trivalent arsenic compounds having aliphatic, and/or cycloaliphatic, and/or heterocyclic, and/or aromatic radicals satisfying its three valences. These radicals may contain a functional group such as the carbonyl, carboxyl, nitro, amino, hydroxy functional groups, saturated or unsaturated carbon-to-carbon linkages, as well as saturated and unsaturated noncarbon-to-carbon linkages.

It is also suitable for an organic radical to satisfy more than one of the valences of the arsenic atom, thereby forming a heterocyclic compound with a trivalent arsenic atom. For example, an alkylene radical may satisfy two arsenic valences with its two open valences and thereby form a cyclic compound. Another example would be the alkylene dioxy radical to form a cyclic compound where oxygen atoms link an alkylene radical to the arsenic atom. In these two examples, the third arsenic valence may be satisfied by any other organic radical.

Another type of structure involving trivalent arsenic having an available pair of electrons are those containing a plurality of such arsenic atoms linked by organic radicals. This type of a compound is called a bidentate ligand when two such arsenic atoms are present, a tridentate ligand when three such arsenic atoms are present, and so forth. Examples of these polydentate ligands include such structures as:

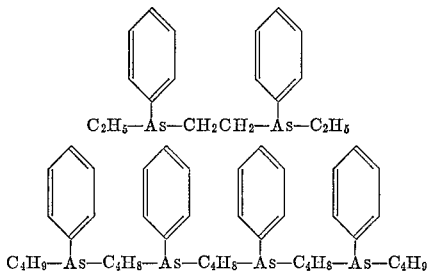

and the like.

Suitable catalysts within the scope of those employed in the process of the invention include the tertiary organoarsine-cobalt-carbonyl complexes represented by the empirical formula:

$$(AsR_3)_p Co(CO)_n \qquad (I)$$

wherein R is an organic radical and $p$ and $n$ are integers, each having a value of at least 1 and whose sum is 4. Each R in the foregoing formula may represent, for example, a hydrocarbyl group such as alkyl (including cycloalkyl), aryl, alkaryl, aralkyl; a hydrocarbyloxy group such as alkoxy, aralkoxy; and the like. The arsenic-containing ligand ($AsR_3$) component of the complex catalyst may thus suitably be tertiary arsine, such as a trialkyl arsine, a trialkaryl arsine, a triaryl arsine, a triaralkyl arsine, a trialkoxy arsine, and the like. The hydrocarbyl and hydrocarbyloxy components, R, need not necessarily be the same and suitable tertiary organo arsine ligands comprise the mixed arsines wherein two or more of the three substituent R's are different members of the groups comprising alkyls, aryls, aralkyls, alkaryls, alkoxy, aralkoxy, and the like. As indicated above, the substituent R's may contain oxygen, halogen (preferably middle halogen) or sulfur atoms. Preferred catalysts of the above-defined class comprise those wherein each R contains from 1 to 20 carbon atoms, and the total number of carbons in the tertiary organoarsine ($R_3As$) group does not exceed about 30. A particularly preferred group of catalysts within the above-defined sub-class are the trialkylarsine-cobalt-carbonyl complexes, and the phenyldialkylarsine-cobalt-carbonyl complexes, wherein the arsenic-containing component of the catalyst is a trialkylarsine or a phenyldialkylarsine in which each alkyl is a lower alkyl having from 1 to 10 carbons of straight or branched chain structure.

It is to be understood that the suitable catalysts identified by the foregoing empirical Formula I may comprise two or more of the $[(R_3As)_p Co(CO)_n]$ groups. For example, in the suitable catalysts, the complex between cobalt, carbon monoxide, and arsenic-containing ligand identified by the foregoing empirical Formula I may be monomeric in structure or may be composed of several monomeric units. Thus, the complex formed between cobalt, carbon monoxide and trialkylarsine, such as triethylarsine-cobalt-carbonyl, tri-n-butylarsine-cobalt-carbonyl, etc., may be present as a dimer.

Similarly the suitable catalysts comprise the tertiary organoarsine-metal-carbonyl complexes consisting essentially of a metal from the group consisting of manganese, ruthenium, rhodium, rhenium, osmium, iridium and platinum, in complex combination with the above-defined tertiary organoarsines and carbon monoxide.

Specific examples of suitable catalysts of the above-defined class comprise complexes between (a) a metal selected from the group consisting of manganese, cobalt, ruthenium, rhodium, rhenium, osmium, iridium and platinum, (b) carbon monoxide, and (c) one of the following tertiary organoarsines:

Trimethylarsine
Triethylarsine
Tri-n-butylarsine
Triamylarsines
Trihexylarsines
Tripropylarsine
Trinonylarsines
Tridecylarsines
Di-n-butyl octadecylarsine
Triethylhexylarsine
Dimethyl-ethylarsine
Diamylethylarsine
Triphenylarsine
Tris(dimethylphenyl)arsine
Dicyclohexylmethylarsine
Ethyl-bis(β-phenylethyl)arsine
Tricyclopentylarsine
Tricyclohexylarsine
Dimethyl-cyclopentylarsine
Trioctylarsine
Phenyldiethylarsine
Dicyclohexylphenylarsine
Diphenylmethylarsine
Diphenylbutylarsine
Diphenylbenzylarsine
Trilaurylarsine
Triethoxyarsine
n-Butyldiethoxyarsine Of these catalysts, the triacylic aliphatic arsines, trialicyclic aliphatic (cycloalkyl) arsines and the phenyldialkyl arsines are preferred. Particularly preferred catalysts comprise the cobalt-containing complexes, such as, for example, cobalt-carbonyl-tri-n-butylarsine

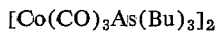
[Co(CO)₃As(Bu)₃]₂ cobalt - carbonyl-phenyldiethylarsine; cobalt-carbonyl-triethylarsine; and the like.

The complexes used as catalysts in the process of this invention may be prepared by a diversity of methods. A convenient method is to combine an organic or inorganic salt of the suitable Group VIIB or Group VIII metal with the desired arsenic-containing ligand, for example, a triorganoarsine such as, for example, a trialkylarsine, a phenyldialkylarsine, triphenylarsine, or the like, in liquid phase. Suitable metal salts comprise, for example, the carboxylates such as acetates, octoates, etc., as well as the mineral acid salts such as chlorides, sulfates, sulfonates, etc., of the suitable Group VIIB and Group VIII metals. The valence state of the Group VIIB and Group VIII metals may then be reduced and the suitable complex formed by heating the solution in an atmosphere of hydrogen and carbon monoxide. The reduction may be performed prior to the use of the catalysts or it may be accomplished simultaneously with the hydroformylation process of this invention. Alternatively, the catalysts may be prepared from a carbon monoxide complex of the suitable Group VIIB and Group VIII metals. For example, it is possible to start with dicobalt octacarbonyl and by heating this substance with a suitable arsenic-containing ligand of the type previously described, such as, for example, trialkylarsine, phenyldialkylarsine, triphenylarsine, or the like, the ligand will replace one or more of the carbon monoxide molecules, producing the desired catalyst. Illustrations of this latter in situ method of catalyst preparation are given in the examples hereinafter. This method is convenient for regulating the number of carbon monoxide molecules and arsenic-containing ligand molecules in the catalyst. Thus, by increasing the amount of arsenic-containing ligand added to the metal carbonyl, for example, dicobalt octacarbonyl, more of the carbon monoxide molecules are replaced.

Due to the complex nature of their composition the suitable catalysts may contain residual amounts of starting materials from which they were made, or components thereof, for example, halogen, such as chlorine.

In accordance with the invention, olefinic compounds are hydroformylated to reaction products predominating in aldehydes and/or alcohols by intimately contacting the olefinic compound in liquid phase with carbon monoxide and hydrogen in the presence of the above-defined catalysts comprising a complex of (a) a Group VIIB or Group VIII metal with (b) an arsenic-containing ligand and (c) carbon monoxide at well-defined conditions of temperature and pressure.

An advantage inherent in the process of the invention resides in the ability of the catalyst to remain stable and exhibit high activity for relatively long periods of time at very low pressures. Consequently, hydroformylation in accordance with the present invention may be carried out at pressures well below 1000 p.s.i.g. to as low as 1 atmosphere or less. Under comparable conditions, catalysts of the prior art, such as dicobalt octacarbonyl, often decompose and become inactive. The invention is, however, not limited in its applicability to the lower pressures and pressures in the broad range from atmospheric up to about 2000 p.s.i.g. and higher may be employed. The specific pressure preferably used will be governed to some extent by the specific charge and catalyst employed. In general, pressures in the range of from about 300 to about 1500 p.s.i.g. and particularly in the range of from about 400 to about 800 p.s.i.g. are preferred. The unique stability of the catalysts of the present invention at the lower pressures makes the use of pressures below about 1500 p.s.i.g. particularly desirable.

Temperatures employed may range from about 100° to about 250° C. and preferably from about 125° to about 175° C. The specific temperature preferably employed will be governed to some extent by the specific catalyst complex, olefinic charge and operating conditions used. A temperature of about 150° C. is generally satisfactory. Higher or lower temperatures may, however, be used within the scope of the invention.

The ratio of catalyst to the olefin to be hydroformylated is generally not critical and may vary widely within the scope of the invention. It may be controlled to obtain a substantially homogeneous reaction mixture. Solvents are therefore not essential. However, the use of solvents which are inert, or which do not interfere to any substantial degree with the desired hydroformylation reaction under the conditions employed, may be used within the scope of the invention. Saturated liquid hydrocarbons, for example, may be used as solvent in the process, as well as ketones, ethers, and the like. Ratios of catalyst to olefin between about 1:1000 and about 10:1 are found to be satisfactory; higher or lower catalyst to olefin ratios may, however, be used within the scope of the invention.

The ratio of hydrogen to carbon monoxide charged may vary widely within the scope of the invention. In general, a mole ratio of hydrogen to carbon monoxide of at least about 1 is employed. Suitable ratios of hydrogen to carbon monoxide comprise those within the range of from about 1 to about 10. Higher or lower ratios may, however, be employed within the scope of the invention. The ratio of hydrogen to carbon monoxide preferably employed will be governed to some extent by the nature of the reaction product desired. If conditions are selected that will result primarily in an aldehyde product, only one mole of hydrogen per mole of carbon monoxide enters into reaction with the olefin. When the alcohol is the desired product, two moles of hydrogen and one mole of carbon monoxide react with each mole of olefin. The minimum ratio of hydrogen to carbon monoxide employed will therefore generally be governed by the product desired. The use of ratios of hydrogen to carbon monoxide which are somewhat higher than those defined by these stoichiometrical values are generally preferred.

A signal advantage of the present invention as indicated above and further evidenced by the following examples is the ability to effect the direct, single stage hydroformylation of the olefins to a reaction mixture wherein the alcohols predominate over the aldehydes. The alcohol product obtained from the starting normal olefins furthermore generally predominates in straight chain or normal isomers. By selection of reaction conditions within the above-defined range, it is now possible to obtain from a normal olefin a product which consists predominantly of a normal or straight chain compound rather than various branched-chain isomers. Generally, the alcohol is the desired end product and the catalysts defined herein will produce this product under a relatively wide range of conditions. However, by varying the operating conditions within the range defined herein, a considerable degree of control over the ratio of aldehyde to alcohol in the product is provided. Adjustment of these variables also enables considerable control over the production of a particular isomer.

A valuable aspect of the invention resides in its ability to effect the direct, single stage hydroformylation of internal normal olefins, having for example, from 4 to 19 carbon atoms to the molecule, to normal terminal alcohols having 5 to 20 carbon atoms to the molecule, respectively. Olefinic hydrocarbon fractions, such as, for example, polymeric olefinic fractions, cracked wax fractions, and the like, containing substantial proportions of internal olefins are readily hydroformylated to fractions of hydroformylated products comprising mixtures of terminal aldehydes and alcohols having one more carbon than the olefins in the charge and wherein these alcohols are the predominant reaction product. Such suitable feeds consisting of olefinic hydrocarbon fractions include, for example, C₇, C₈, C₉, C₁₀ and higher olefinic fractions as well as olefinic hydrocarbon fractions of wider boiling ranges such as $C_{7-9}$, $C_{10-13}$, $C_{12-16}$, $C_{14-17}$ olefinic hydrocarbon fractions and the like.

Under the above-defined conditions, the olefinic charge will react with carbon monoxide and hydrogen with the formation of reaction products comprising aldehydes and/or alcohols having one or more carbon atom per molecule than the olefin charged.

The reaction mixtures obtained may be subjected to suitable catalyst and product separating means comprising one or more such steps, for example, as stratification, solvent extraction, distillation, fractionation, adsorption, etc. Catalyst, or components thereof, as well as unconverted charge, solvent, etc., may be recycled in part or entirely, to the reaction zone.

The process of this invention is generally applicable to the hydroformylation of any aliphatic or cycloaliphatic compound having at least one ethylenic carbon-to-carbon bond. Thus, it is applied to the hydroformylation of olefins having, for example, from 2 to 19 carbons to reaction mixtures predominating in aliphatic aldehydes and alkanols having one more carbon atom than the starting olefin. The invention is used to advantage in the hydroformylation of carbon-to-carbon ethylenically unsaturated linkages in hydrocarbons. Monoolefins such as ethylene, propylene, butylene, pentenes, hexenes, heptenes, octenes, their homologues, etc. are a few examples of suitable hydrocarbons. Suitable hydrocarbons include both branched- and straight-chain compounds having one or more of these ethylenic or olefinic sites. These sites may be conjugated, as in 1,3-butadiene, or non-conjugated, as in 1,5-hexadiene. In the case of polyolefins, it is possible to hydroformylate only one of the olefinic sites or several or all of these sites. The unsaturated carbon-to-carbon olefinic linkages may be between terminal and their adjacent carbon atoms, as in 1-pentene, or between internal chain carbon atoms, as in 4-octene.

Hydroformylation of macromolecular materials involving acyclic units of the above types such as polydiolefins like polybutadiene, as well as copolymers of olefins and diolefins like the styrene-butadiene copolymer, is also comprised within the scope of the invention.

Hydrocarbon cyclic compounds are equally suitable for use in this invention. This group includes the unsaturated alicyclic hydrocarbons such as the cyclic olefins containing carbon-to-carbon unsaturation such as the cycloalkenes like cyclopentene, cyclohexene, cycloheptene and 1,5-cyclooctadiene. Also included in this category are the terpenes and fused-ring polycyclic olefins, such as 2,5-bicyclo(2,2,1)-heptadiene, 1,4,4a,5,8,8a-hexahydro-1,4,5,8-dimethanonaphthalene and the like.

The process of this invention may also be used to hydroformylate ethylenic carbon-to-carbon linkages of non-hydrocarbons. Thus, it is possible to hydroformylate olefinically unsaturated alcohols, aldehydes, and acids to corresponding alcohols, aldehydes, and acids containing an aldehyde or hydroxy group on one of the carbon atoms previously involved in the olefinic bond of the starting material. The following are a few specific examples of different types of olefinic compounds that may be hydroformylated in accordance with the invention and the products obtained thereby:

$$CH_3(CH_2)_3CH=CH_2 + CO + H_2 \xrightarrow[\Delta]{\text{catalyst}} CH_3(CH_2)_5CHO$$

1-hexane → 1-heptanal and/or $CH_3(CH_2)_5CH_2OH$ + isomeric products
1-heptanol $$CH_2=CHCl + CO + H_2 \xrightarrow[\Delta]{\text{catalyst}} ClCH_2CH_2CH_2OH$$

3-chloropropanol and/or $ClCH_2CH_2CHOH$ + isomeric products
3-chloropanal $$CH_3COOCH_2CH=CH_2 + CO + H_2 \xrightarrow[\Delta]{\text{catalyst}} CH_3COOCH_2CH_2CH_2CHO$$

gamma-acetoxybutryaldehyde and/or $CH_3COOCH_2CH_2CH_2CH_2OH$ + isomeric products
Δ-acetoxybutanol cyclopentene + CH + H$_2$ $\xrightarrow[\Delta]{\text{catalyst}}$ formylcyclopentane and/or cyclopentylcarbinol $$C_2H_5OCOCH=CHCOOC_2H_5 + CO + H_2 \xrightarrow[\Delta]{\text{catalyst}}$$

diethyl fumarate $C_2H_5OCOCHCH_2COOC_2H_5$ with CHO substituent
diethyl α-formylsuccinate and/or $C_2H_5OCOCHCH_2COOC_2H_5$ with CH$_2$OH substituent
diethyl α-methylolsuccinate allyl benzene —CH$_2$CH=CH$_2$ + CO + H$_2$ $\xrightarrow[\Delta]{\text{catalyst}}$ —CH$_2$CH$_2$CH$_2$CHO
γ-phenylbutyraldehyde and/or —CH$_2$CH$_2$CH$_2$CH$_2$OH + isomeric products
Δ-phenylbutanol The olefinic charge to the process of the invention may comprise two or more of the above-defined suitable olefins. Olefinic hydrocarbon fractions are hydroformylated under the conditions above-defined to mixtures of aldehydes and alcohols in which the alcohols predominate.

*Example I*

Pentene, taken as a typical olefin, was hydroformylated by reaction with carbon monoxide and hydrogen in the presence of a catalyst consisting of cobalt in complex combination with carbon monoxide and triethylarsine in a reactor comprising a 100-ml. stainless steel autoclave provided with magnetic stirrer, connected to a 0.1000 p.s.i.a. transducer and to a source of premixed hydrogen-carbon monoxide gas. The volume of the external fittings was kept to a minimum to provide a maximum sensitivity of pressure to the change in number of millimoles of hydrogen and carbon monoxide present. The catalyst complex was prepared in situ by bringing together dicobalt octacarbonyl and triethylarsine and heating, in an atmosphere comprising carbon monoxide and hydrogen, to about 155° C., thereby forming the cobalt-carbonyl-triethylarsine complex. The presence of a complex presented by the empirical formula ((triethylarsine)Co(CO)$_3$) was indicated by analysis.

In a Run A, 0.064 mole of pentene, 20 ml. of n-hexane (solvent), 0.001 mole dicobalt octacarbonyl, and 0.035 mole triethylarsine were charged to the reactor. A Teflon magnetic stirring bar was added. The reactor was closed, cooled, evacuated, flushed with H$_2$-CO gas and then pressured with admixed hydrogen-carbon monoxide gas containing a mole ratio of H$_2$:CO of 2. The autoclave was then heated to 155° C. by an external heater. The maximum pressure obtained in the reactor was 425 p.s.i.g. Stirring of the autoclave contents was effected by the Teflon-covered magnetic stirring bar inside the autoclave which was set in motion by an external magnetic stirring motor. The pressure decrease resulting from consumption of hydrogen and carbon monoxide was recorded on a Daystrom-Weston recorder. After six hours the autoclave was cooled and the contents analyzed. The results obtained are given in the following Table I.

For the purpose of comparison, there are also given in the following Table I, results obtained in a Run B carried out under sustantially identical conditions as Run A but with the exception that the sole catalyst present was dicobalt octacarbonyl.

TABLE I

| Run | A | B |
|---|---|---|
| Catalyst | Cobalt-carbonyl-triethyl-arsine complex | Dicobalt octacarbonyl |
| Conversion, percent | 88 | 50 |
| Selectivity to Formylation Products, percent: | | |
| Total | 88.4 | |
| C$_6$ aldehydes | 14.4 | 96 |
| C$_6$ alcohols | 73.6 | 4 |
| Product Isomer Distribution (aldehydes and alcohols), percent: | | |
| n-Hexyl | 59.4 | 50 |
| 2-methylpentyl | 38.0 | 50 |
| 2-ethylbutyl | 2.6 | |

The cobalt-carbonyl-triethylarsine complex present as catalyst in Run A remained stable throughout the course of the operation. The dicobalt octacarbonyl in Run B was decomposed completely.

*Example II*

In an operation, Run C, pentene-1 was reacted with admixed carbon monoxide-hydrogen gas, containing a mole ratio of H$_2$:CO of 2.1, in the presence of a catalyst consisting essentially of cobalt-carbon monoxide-tri-n-butylarsine complex. The reaction was executed in the presence of n-octane as solvent, at 150° C. and a maximum carbon monoxide-hydrogen gas pressure of 375 p.s.i.g. The catalyst complex was present in an amount approximately equal to 0.031 mole of catalyst complex per mole of pentene-1 charged. The results obtained are given in the following Table II.

In an operation, Run D, the operation of foregoing Run C was repeated under substantially identical conditions but with the exception that the maximum pressure was 350 p.s.i.g. and the catalyst used was cobalt-carbonyl-tri-(2-ethylhexyl)arsine complex. Results obtained are given in the following Table II.

In an operation, Run E the operation of Run D was repeated under substantially identical conditions but with the exception that the catalyst used was cobalt-carbonyl-phenyldiethylarsine. Results obtained are given in the following Table II.

TABLE II

| Run | C | D | E |
|---|---|---|---|
| Catalyst | Cobalt-carbonyl-tri-n-butylarsine complex | Cobalt-carbonyl-tri-2-ethylhexylarsine complex | Cobalt-carbonyl-phenyldiethylarsine complex |
| Conversion, percent | 82.8 | 40.2 | 98.9 |
| Selectivity to Formylation Products, percent: | | | |
| Total | 80.6 | 92.0 | 85.0 |
| C$_6$ aldehydes | 28.7 | 70.6 | 18.4 |
| C$_6$ alcohols | 51.9 | 21.4 | 66.6 |
| Product isomer distribution (aldehydes and alcohols), percent: | | | |
| n-Hexyl | 67.8 | 49.4 | 55.7 |
| 2-methylpentyl | 32.2 | 50.6 | 44.3 |
| 2-ethylbutyl | | | |

*Example III*

Similarly, the following olefinic compounds are hydroformylated to hydroformylation products consisting of aldehydes and alcohols having one more carbon atom to the molecule than the olefinic charge, in the presence of the cobalt-carbonylarsine complex catalysts and under the reaction conditions set forth in the foregoing Examples I and II:

Propylene
1-butene
2-pentene
Isobutylene
2-methyl-1-pentene
Cyclohexene
Dodecene
C$_{12-14}$ olefinic hydrocarbon fraction

*Example IV*

Hydroformylation products consisting predominantly of C$_6$ alkanols and corresponding aldehydes are obtained by reacting pentene-1 with admixed hydrogen-carbon monoxide gas containing a mole ratio of H:CO of 2.1, in the presence of n-hexane as solvent, at a temperature of 155° C. and a maximum pressure of 500 p.s.i.g., in the presence of each of the following catalyst complexes:

(a) Rhodium-carbonyl-tri-n-butylarsine complex
(b) Iridium-carbonyl-tri-n-butylarsine complex
(c) Platinum-carbonyl-phenyl-diethylarsine complex
(d) Ruthenium-carbonyl-dicyclohexylmethylarsine complex

We claim as our invention:

1. The process for the production of aldehydes and alcohols, which comprises contacting an olefinic hydrocarbon having from two to nineteen carbon atoms to the molecule with carbon monoxide and hydrogen, at a temperature of from about 100° to 250° C., in the presence of a complex catalyst consisting essentially of cobalt, in complex combination with carbon monoxide and a trihydrocarbylarsine wherein each hydrocarbyl group in said trihydrocarbylarsine is selected from the group consisting of alkyl, aryl, alkaryl and aralkyl groups each having from one to twenty carbons, thereby reacting said olefinic hydrocarbon with said carbon monoxide and hydrogen with the formation of aldehydes and alcohols having one more carbon atom than the olefinic hydrocarbon.

2. The process for the production of aldehydes and alcohols, which comprises contacting a mono-olefinic hydrocarbon having from two to nineteen carbon atoms to the molecule with carbon monoxide and hydrogen, at a temperature of from about 100° to about 250° C., and a pressure of from about 1 atmosphere to about 2000 p.s.i.g., in the presence of a complex catalyst consisting essentially of cobalt in complex combination with carbon monoxide and a trihydrocarbylarsine wherein each hydrocarbyl group in said trihydrocarbylarsine is selected from the group consisting of alkyl, aryl, alkaryl and aralkyl groups each having from one to twenty carbons, thereby reacting said mono-olefinic hydrocarbon with said carbon monoxide and hydrogen with the formation of aldehydes and alcohols having one more carbon atom than said mono-olefinic hydrocarbon.

3. The process for the production of oxygenated hydrocarbons consisting essentially of aliphatic aldehydes and alcohols having from 3 to 20 carbon atoms to the molecule, which comprises contacting a mono-olefinic hydrocarbon having from 2 to 19 carbon atoms to the molecule, at a temperature of from about 100° to about 250° C., and a pressure of from about 1 atmosphere to about 1500 pounds, with a catalyst consisting essentially of cobalt, in complex combination with carbon monoxide and trialkylarsine thereby reacting said mono-olefinic hydrocarbon with carbon monoxide and hydrogen with the formation of aliphatic aldehydes and alcohols having from 3 to 20 carbon atoms to the molecule.

4. The process in accordance with claim 3 wherein said tri-alkylarsine is tri-n-butylarsine.

5. The process for the production of aliphatic aldehydes and alcohols having from 3 to 20 carbon atoms to the molecule, which comprises reacting a mono-olefin having from 2 to 19 carbon atoms to the molecule, at a temperature of from about 125° to about 175° C., and a pressure of from about 1 atmosphere to about 1500 p.s.i.g., in the presence of a complex catalyst represented by the empirical formula:

$$(AsR_3)_p Co(CO)_n$$

wherein each R is a hydrocarbyl group of from 1 to 20 carbons selected from the group consisting of alkyl, aryl, aralkyl and alkaryl groups, and $p$ and $n$ are integers whose sum is 4 and which each has a minimum value of 1.

6. The process in accordance with claim 5 wherein said catalyst consists essentially of cobalt in complex combination with carbon monoxide and phenyl diethyl arsine.

7. The process for the direct single-stage conversion of an olefinic hydrocarbon having from 2 to 19 carbon atoms to a corresponding aliphatic alcohol having one more carbon atom to the molecule than said olefinic hydrocarbon, which comprises reacting said olefinic hydrocarbon with carbon monoxide and hydrogen, at a temperature of from about 100 to about 175° C., and a pressure of from about 1 atmosphere to about 800 pounds in the presence of a complex catalyst of the empirical formula:

$$(AsR_3)_p Co(CO)_n$$

wherein R represents an alkyl group of 1 to 20 carbons and $p$ and $n$ are integers whose sum is four and each of which has a minimum value of 1.

8. The process in accordance with claim 7 wherein said R is n-butyl.

9. The process in accordance with claim 7 wherein said catalyst consists essentially of cobalt in complex combination with carbon monoxide and triethylarsine.

10. The process in accordance with claim 7 wherein said catalyst consists essentially of cobalt in complex combination with carbon monoxide and tri-n-butylarsine.

11. The process in accordance with claim 7 wherein said catalyst consists essentially of cobalt in complex combination with carbon monoxide and tri-(2-ethylhexyl)arsine.

12. The process for the production of reaction products consisting essentially of aldehydes and alcohols having six carbons to the molecule, which comprises reacting a pentene with carbon monoxide and hydrogen, at a temperature of from about 100 to about 175° C., and a pressure of from about 1 atmosphere to about 1500 pounds, in the presence of a complex catalyst represented by the empirical formula:

$$(AsR_3)_p Co(CO)_n$$

wherein R represents alkyl of 1 to 20 carbons and $p$ and $n$ are integers whose sum is four and each has a minimum value of 1.

13. The process for the production of n-hexanol, which comprises reacting a normal pentene with carbon monoxide and hydrogen, at a temperature of from about 100° to about 175° C., and a pressure of from about 400 to about 800 pounds, in the presence of a complex catalyst of the empirical formula:

$$(\text{tri-n-butylarsine})_p Co(CO)_n$$

wherein $p$ and $n$ are integers each having a minimum value of one and whose sum is four.

References Cited by the Examiner
UNITED STATES PATENTS

| | | | |
|---|---|---|---|
| 2,327,066 | 8/1943 | Roelen | 260—604 |
| 3,102,899 | 9/1963 | Cannell | 260—439 |

LEON ZITVER, *Primary Examiner.*

B. HELFIN, R. H. LILES, *Assistant Examiners.*